US008868843B2

(12) United States Patent
Loh et al.

(10) Patent No.: US 8,868,843 B2
(45) Date of Patent: Oct. 21, 2014

(54) HARDWARE FILTER FOR TRACKING BLOCK PRESENCE IN LARGE CACHES

(75) Inventors: Gabriel H. Loh, Bellevue, WA (US); Mark D. Hill, Madison, WI (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 268 days.

(21) Appl. No.: 13/307,815

(22) Filed: Nov. 30, 2011

(65) Prior Publication Data

US 2013/0138894 A1    May 30, 2013

(51) Int. Cl.
 G06F 12/08    (2006.01)
(52) U.S. Cl.
 CPC .................................. *G06F 12/0888* (2013.01)
 USPC .......................................... 711/138; 711/152
(58) Field of Classification Search
 CPC . G06F 12/08; G06F 12/0888; G06F 12/0831; G06F 12/0804
 See application file for complete search history.

(56) References Cited

U.S. PATENT DOCUMENTS

| 5,649,156 | A | | 7/1997 | Vishlitzky et al. | |
|---|---|---|---|---|---|
| 5,752,045 | A | | 5/1998 | Chen | |
| 5,860,106 | A | * | 1/1999 | Domen et al. | 713/324 |
| 5,881,311 | A | | 3/1999 | Woods | |
| 5,968,135 | A | * | 10/1999 | Teramoto et al. | 713/375 |
| 6,081,871 | A | * | 6/2000 | Hwangbo | 711/118 |
| 6,295,580 | B1 | | 9/2001 | Sturges et al. | |
| 6,349,363 | B2 | | 2/2002 | Cai et al. | |
| 6,608,625 | B1 | * | 8/2003 | Chin et al. | 345/501 |
| 6,681,297 | B2 | * | 1/2004 | Chauvel et al. | 711/130 |
| 6,721,856 | B1 | | 4/2004 | Arimilli et al. | |
| 6,751,706 | B2 | | 6/2004 | Chauvel et al. | |
| 6,795,896 | B1 | * | 9/2004 | Hart et al. | 711/118 |
| 6,986,003 | B1 | * | 1/2006 | Sipple et al. | 711/145 |
| 7,006,100 | B2 | | 2/2006 | Phong et al. | |
| 7,089,391 | B2 | | 8/2006 | Geiger et al. | |

(Continued)

FOREIGN PATENT DOCUMENTS

WO        2010142432 A2    12/2010

OTHER PUBLICATIONS

Unsal et al.; "Cool-Cache for Hot Multimedia;" Proceedings of the 34th ACM/IEEE International Symposium on Microarchitecture, Dec. 1-5, 2001, 274-283.

(Continued)

*Primary Examiner* — Kalpit Parikh
*Assistant Examiner* — Alvaro R Calderon, IV
(74) *Attorney, Agent, or Firm* — Rory D. Rankin; Meyertons, Hood, Kivlin, Kowert & Goetzel P.C.

(57) ABSTRACT

A system and method for efficiently determining whether a requested memory location is in a large row-based memory of a computing system. A computing system includes a processing unit that generates memory requests on a first chip and a cache (LLC) on a second chip connected to the first chip. The processing unit includes an access filter that determines whether to access the cache. The cache is fabricated on top of the processing unit. The processing unit determines whether to access the access filter for a given memory request. The processing unit accesses the access filter to determine whether given data associated with a given memory request is stored within the cache. In response to determining the access filter indicates the given data is not stored within the cache, the processing unit generates a memory request to send to off-package memory.

20 Claims, 9 Drawing Sheets

(56) References Cited

U.S. PATENT DOCUMENTS

| | | |
|---|---|---|
| 7,093,081 B2 | 8/2006 | DeWitt, Jr. et al. |
| 7,257,678 B2 | 8/2007 | Golden et al. |
| 7,257,679 B2 | 8/2007 | Clark |
| 8,335,122 B2 * | 12/2012 | Dreslinski et al. ............ 365/226 |
| 8,458,404 B1 * | 6/2013 | Delgross et al. ............. 711/128 |
| 8,627,009 B2 * | 1/2014 | Mekhiel ........................ 711/122 |
| 8,700,864 B2 * | 4/2014 | Hiniker-Roosa ............. 711/145 |
| 8,725,953 B2 * | 5/2014 | Paver et al. .................. 711/141 |
| 2003/0126186 A1 | 7/2003 | Rodgers et al. |
| 2003/0217115 A1 | 11/2003 | Rowlands |
| 2004/0073905 A1 | 4/2004 | Emer et al. |
| 2006/0143404 A1 * | 6/2006 | Chen et al. ................... 711/141 |
| 2008/0028150 A1 * | 1/2008 | Toussi .......................... 711/122 |
| 2008/0155229 A1 * | 6/2008 | Beyer et al. .................. 711/216 |
| 2011/0119322 A1 | 5/2011 | Li et al. |
| 2012/0137075 A1 * | 5/2012 | Vorbach ....................... 711/122 |

OTHER PUBLICATIONS

"Power Managed Second-Level Cache Control, XP 000587428;" IBM Technical Disclosure Bulletin, vol. 39, No. 4, Apr. 1996; pp. 79-82.

"Prescott New Instructions Software Developer's Guide;" Intel Corporation, Jan. 2004, pp. 1-92.

International Search Report in related Application No. PCT/US2005/033671, Feb. 13, 2006, pp. 1-3.

International Search Report in related Application No. PCT/US2005/033819, Dec. 29, 2006, pp. 1-2.

International Search Report and Written Opinion in application No. PCT/US20121066318, Apr. 4, 2013 pp. 1-13.

* cited by examiner

HARDWARE FILTER FOR TRACKING BLOCK PRESENCE IN LARGE CACHES

BACKGROUND OF THE INVENTION

1. Field of the Invention

This invention relates to computing systems, and more particularly, to efficiently determining whether a requested memory location is in a large row-based memory of a computing system.

2. Description of the Relevant Art

As both semiconductor manufacturing processes advance and on-die geometric dimensions reduce, semiconductor chips provide more functionality and performance. However, design issues still arise with modern techniques in processing and integrated circuit design that may limit potential benefits. One issue is interconnect delays continue to increase per unit length in successive generations of two-dimensional planar layout chips. High electrical impedance between individual chips increases latency. In addition, signals that traverse off-chip to another chip increase power consumption for these signals due to the increased parasitic capacitance on these longer signal routes.

Another design issue is most software applications that access a lot of data are typically memory bound. A memory access latency for an off-chip dynamic random access memory (DRAM) may be hundreds to over a thousand clock cycles. An increased number of cores in a processor design have accentuated the memory bandwidth problem. Recently, progress has been made in three-dimensional integrated circuits (3D ICs) that include two or more layers of active electronic components integrated both vertically and horizontally into a single circuit. The 3D packaging, known as System in Package (SiP) or Chip Stack multi-chip module (MCM), stacks separate chips in a single package. All components on the layers communicate using on-chip signaling, whether vertically or horizontally. This signaling provides reduced interconnect signal delay over known two-dimensional planar layout circuits.

The manufacturing trends in the above description may lead to gigabytes of integrated memory within a package. Additional on-chip storage may be used as a row-based memory, such as a last-level cache (LLC) before accessing off-chip memory. A reduced miss rate achieved by the additional memory helps hide the latency gap between a processor and its off-chip memory. In addition, power consumption may be reduced and utilization of buses may become more efficient.

Although a cache hit within a large on-chip LLC may reduce the latency to retrieve requested data, a cache miss may increase the overall latency. To save bandwidth and power consumption, the memory request may not be sent to the off-chip memory until a hit/miss result for the large on-chip LLC is known. A mechanism for determining whether a memory request may find a requested memory location within the large on-chip LLC may allow the memory request to be sent earlier to the off-chip memory. Thus, power consumption may be reduced as the large on-chip LLC is not accessed and the over all memory latency may also be reduced.

In view of the above, efficient methods and systems for determining whether a requested memory location is in a large row-based memory of a computing system are desired.

SUMMARY OF EMBODIMENTS OF THE INVENTION

Systems and methods for efficiently determining whether a requested memory location is in a large row-based memory of a computing system are contemplated.

In one embodiment, a computing system includes a processing unit that generates memory requests on a first chip and a cache on a second chip connected to the first chip. In various embodiments, the cache may be a last-level cache (LLC) in a memory hierarchy before a system memory. The processing unit includes an access filter that determines whether to access the LLC. In one embodiment, the LLC is a three-dimensional (3D) integrated circuit (IC), which may be fabricated vertically on top of the processing unit or horizontally next to the processing unit. The 3D IC used as a cache may utilize at least one of the following memory configurations: a dynamic random access memory (DRAM), a phase-change memory (PCM), an array of memristors (RRAM), and a spin-torque transfer magnetoresistive RAM (STT-MRAM). The processing unit is at least one of the following: a general-purpose microprocessor, a graphics processing unit (GPU), an accelerated processing unit (APU) and a field programmable gate array (FPGA).

The processing unit determines whether to access the access filter for a given memory request based on a condition. In response to determining the condition is satisfied, the processing unit accesses the access filter to determine whether given data associated with a given memory request is stored within the LLC. In response to determining the access filter indicates the given data is not stored within the LLC, the processing unit generates a memory request to send to off-package memory.

These and other embodiments will be further appreciated upon reference to the following description and drawings.

Figure 1:
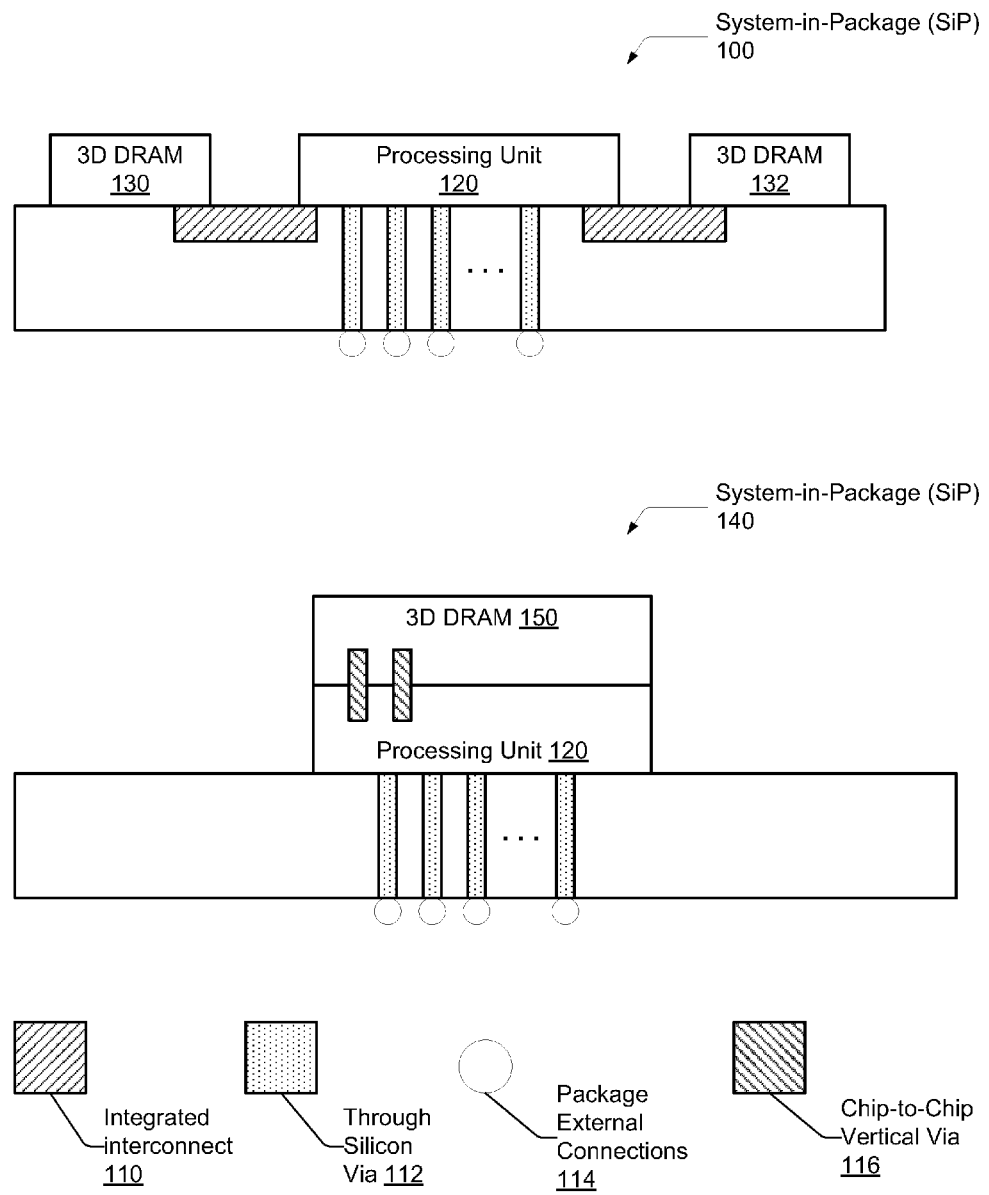
FIG. 1 is a generalized block diagram of embodiments of a system-in-package (SiP).

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Turning now to FIG. 1, a generalized block diagram of embodiments of a system-in-package (SiP) 100 and 140 are shown. Three-dimensional (3D) packaging may be used within a computing system. This type of packaging may be referred to as a System in Package (SiP). A SiP includes one or more three-dimensional integrated circuits (3D ICs). A 3D IC includes two or more layers of active electronic components integrated both vertically and/or horizontally into a single circuit. In one embodiment, interposer-based integration may be used whereby the 3D IC may be placed next to the processing unit 120. Alternatively, a 3D IC may be stacked directly on top of another IC.

Die-stacking technology is a fabrication process that enables the physical stacking of multiple separate pieces of silicon (integrated chips) together in a same package with high-bandwidth and low-latency interconnects. The die may be stacked side by side on a silicon interposer, or vertically directly on top of each other. One configuration for the SiP is to stack one or more 3D DRAM chips next to and/or on top of a processing unit. By stacking 3D DRAM chips, a very large cache for the system may be realized for the processing unit. In one embodiment, this large cache may have a size on the order of several hundred MB (or more).

As shown, in one embodiment, the SiP 100 may include a processing unit 120 and one or more three-dimensional (3D) DRAM 130 and 132 that communicate with the processing unit 120 through horizontal low-latency interconnect 110. In one embodiment, the processing unit 120 may be a general-purpose central processing unit (CPU), which may also be referred to as a microprocessor. Other types of processing units may include a graphics processing unit (GPU), a field programmable gate array (FPGA), or an accelerated processing unit (APU). Generally, an APU is a chip that includes additional processing capability. This additional processing capability may be used to accelerate one or more types of computations outside of a general-purpose CPU. In one embodiment, an APU may include a general-purpose CPU integrated on a same die with a GPU, a FPGA, or other processing unit, thus improving data transfer rates between these units while reducing power consumption. In other embodiments, an APU may include video processing and other application-specific accelerators. In yet other embodiments, the processing unit may be any other data processing device that makes use of a row-based memory, such as a cache.

The in-package horizontal low-latency interconnect 110 provides reduced lengths of interconnect signals versus long off-chip interconnects when a SiP is not used. The in-package horizontal low-latency interconnect 110 may use particular signals and protocols as if the chips, such as the processing unit 120 and the 3D DRAMs 130 and 132 were mounted in separate packages on a circuit board. The SiP 100 may additionally include backside vias or through-bulk silicon vias 112 that reach to package external connections 114. The package external connections 114 may be used for input/output (I/O) signals and power signals.

In another embodiment, the SiP 140 includes a 3D DRAM 150 stacked directly on top of the processing unit 120. Although not shown, for each of the SiP 100 and the SiP 140, multiple chips, or device layers, may be stacked on top of one another with direct vertical interconnects 116 tunneling through them. The size and density of the vertical interconnects 116 that can tunnel between the different device layers varies based on the underlying technology used to fabricate the 3D ICs.

Figure 2:
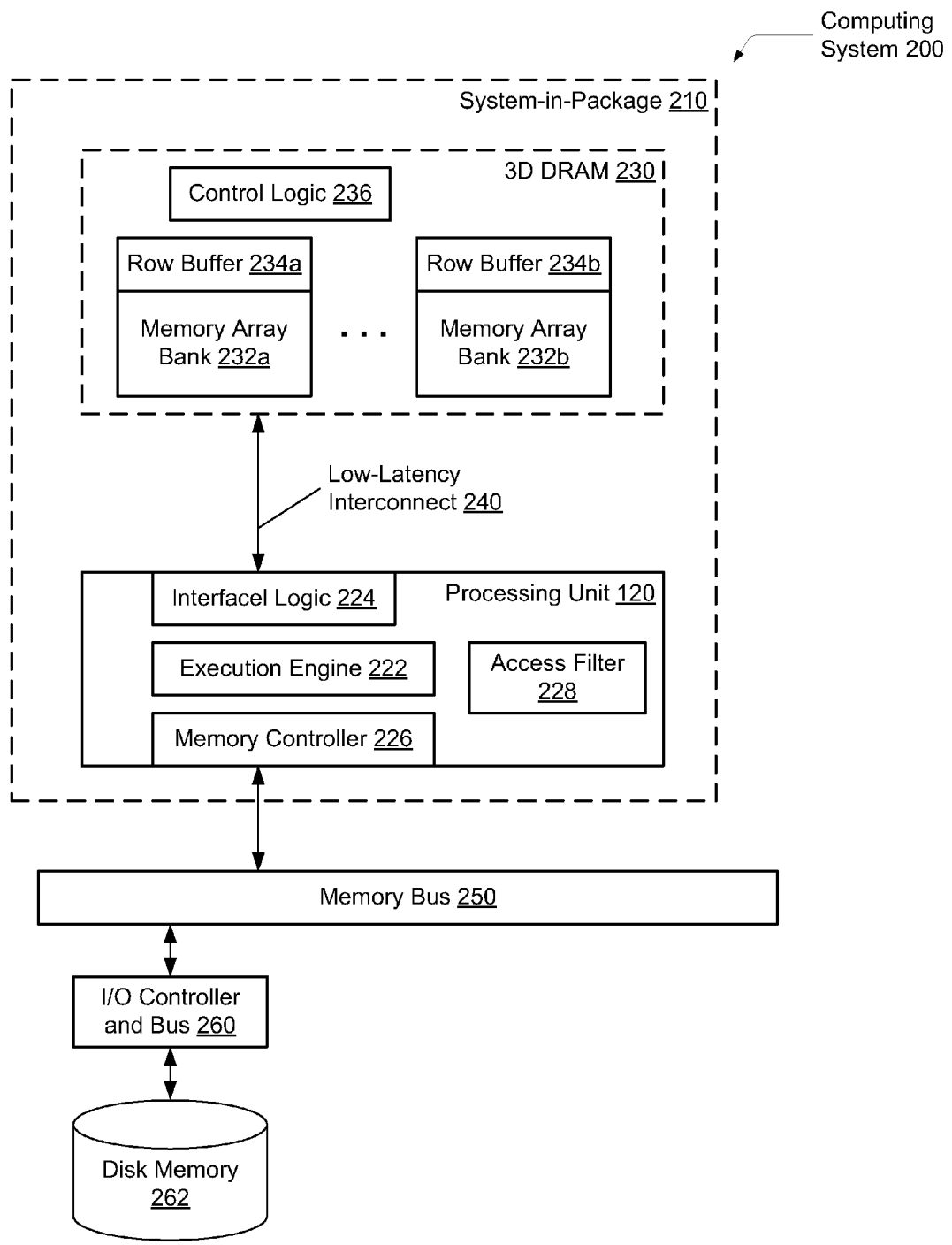
FIG. 2 is a generalized block diagram of one embodiment of a computing system utilizing a three-dimensional (3D) dynamic random access memory (DRAM).

Turning now to FIG. 2, a generalized block diagram of one embodiment of a computing system 200 utilizing a three-dimensional (3D) dynamic random access memory (DRAM) is shown. The computing system 200 may utilize three-dimensional (3D) packaging, such as a System in Package (SiP) as described earlier. The computing system 200 may include a SiP 210. In one embodiment, the SiP 210 may include the processing unit 120 described earlier and a 3D DRAM 230 that communicate through low-latency interconnect 240. The in-package low-latency interconnect 240 may be horizontal and/or vertical with shorter lengths than long off-chip interconnects when a SiP is not used.

Although one embodiment of the SiP 210 is shown utilizing DRAM memory technology, other memory technologies that use a row-based access scheme including one or more row buffers or other equivalent structures are possible and contemplated. Examples of other memory technologies include phase-change memory (PCM), memristors (RRAM), and spin-torque transfer magnetoresistive RAM (STT-MRAM).

The processing unit 120 may include an execution engine 222 for performing calculations and work for algorithms described by software applications. In one embodiment, the execution engine 222 may include one or more processor cores of a general-purpose CPU. In another embodiment, the execution engine 222 may include shaders, other graphics processing blocks and a single-instruction-multiple-data (SIMD) pipeline of a GPU to perform data-centric operations for at least graphics rendering and 3D graphics applications. Other examples of circuitry for data processing according to given algorithms are possible and contemplated.

In one embodiment, the processing unit 120 includes a cache memory subsystem or one or more memory buffers for storing software application instructions and data values. The cache memory subsystem may include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block may be varied according to design choice, and may be of any size. In addition, each of the terms "cache tag", "cache line tag", and "cache block tag" is interchangeable.

The processing unit 120 may communicate with off-package memory, such as the disk memory 262 through the memory controller 226, the memory bus 250, and the I/O controller and bus 260. As shown, in one embodiment, the computing system 200 may not include off-package DRAM, which would be connected to the memory bus 250. The on-package 3D DRAM 230 may provide a very large on-package memory storage, which reduces a number of off-package memory accesses and hides long memory latencies. Therefore, an off-package DRAM may not be used. In another embodiment, the computing system 200 may include an off-package DRAM.

Off-chip read and write requests may be generated by the execution engine 222 within the processing unit 120 and transmitted to the memory controller 226. The memory controller 226 may store memory requests in queues. The memory controller 226 may translate an address corresponding to the requested block, or memory location, and send the request to an off-chip DRAM and/or the off-chip disk memory 162 through the memory bus 250. Any off-chip DRAM may be filled with data from the off-chip disk memory 262 through the I/O controller and bus 260 and the memory bus 250.

The off-chip disk memory 262 may provide a non-volatile, random access secondary storage of data. In one embodiment, the off-chip disk memory 262 may include one or more hard disk drives (HDDs). The HDDs typically include one or more rotating disks, each coated with a magnetic medium. These disks rotate at a rate of several thousand rotations per minute. A magnetic actuator is responsible for positioning magnetic read/write devices over the rotating disks. In another embodiment, the off-chip disk memory 262 utilizes a Solid-State Disk (SSD). A Solid-State Disk may also be referred to as a Solid-State Drive. An SSD may emulate a HDD interface, but an SSD utilizes solid-state memory to store persistent data rather than electromechanical devices as found in a HDD. For example, an SSD may comprise banks of Flash memory.

The processing unit 120 may include interface logic to I/O devices and other processing units. This interface logic is not shown for ease of illustration. The processing unit 120 may also include the interface logic 224 for communicating with the 3D DRAM 230. Protocols, address formats, and interface signals used in this communication may be similar to the protocols, address formats and interface signals used for any off-package DRAM. One example of a protocol is a double data rate (DDR) type of protocol. The protocol may determine values used for information transfer, such as a number of data transfers per clock cycle, signal voltage levels, signal timings, signal and clock phases and clock frequencies. Protocol examples include DDR2 SDRAM, DDR3 SDRAM, GDDR4 (Graphics Double Data Rate, version 4) SDRAM, and GDDR5 (Graphics Double Data Rate, version 5) SDRAM. The interface logic 224 may include control circuitry for interfacing to one or more memory channels of the 3D DRAM 230 and following a corresponding protocol.

Regardless of a given type of processing unit used in a computing system, as software applications access more and more data, a memory subsystem is utilized more heavily. Latencies become more crucial. More on-chip memory storage may be used to reduce interconnect latencies. For example, the processing unit 120 may use on-die caches and memory buffers.

A reduced miss rate achieved by the on-chip memory storage helps hide the latency gap between the processing unit 120 and the off-chip memory, such as any off-package DRAM and off-package disk memory 262. However, there is limited real estate to use for the on-chip memory storage within the processing unit 120 as advanced computational circuits consume more real estate for higher performance. Therefore, a significant number of accesses may be candidates for sending to the off-package memory.

Continuing with attempts to reduce memory latencies, other technology may be used to provide further on-chip memory storage. For example, three-dimensional integrated circuits (3D ICs) may provide a last-level cache (LLC) through stacked DRAM chips. The 3D DRAM 230 may provide both low-latency interconnects 240 and a significantly large amount of additional in-package memory storage to reduce off-package memory accesses. The interface logic 224 within the processing unit 120 may provide address translations for the 3D DRAM 230.

In some embodiments, the 3D DRAM 230 may include multiple memory array banks 232a-232b. In one embodiment, each one of the banks 232a-232b may include a respective one of the row buffers 234a-234b. Each one of the row buffers 234a-234b may store data in an accessed row of the multiple rows within the memory array banks 232a-232b. The accessed row may be identified by a DRAM address in a received memory request. In other embodiments, the 3D DRAM 230 may include other cache configurations. The control logic 236 may queue received memory requests and decode corresponding addresses to identify and locate requested data.

In one embodiment, a tag array for the last-level cache (LLC) may be stored in synchronous RAM (SRAM) within the processing unit 120. A data array for the LLC may be stored in the 3D DRAM 230. In another embodiment, each of the tag array and the data array for the LLC may be stored within the 3D DRAM 230. A particular choice for the storage of the tag array and the data array storage and a given set-associative cache organization may be based on design tradeoffs. For example, if a tag array is stored in an on-chip SRAM within the processing unit 120, the cost of making the tag array large enough may become greater than desired. The 3D DRAM 230 may store a very large, in-package last-level cache for the processing unit 120. In one embodiment, the data portion of a cache line, or cache block, stores 64 bytes of data. Other sizes are possible and contemplated. In one example, the 3D DRAM 230 has a size of 512 MB, which may store 8,388,608 individual 64-byte cache lines. A corresponding cache tag may have a size of 4 to 8 bytes. For a 4-byte cache tag, a corresponding tag array has a size of 8,388,608 tags×4 bytes/tag=32 MB. Such a large tag array may not be feasibly stored in an on-chip SRAM in the processing unit 120. If the size of the tag array is appreciably reduced, then the data array is also appreciably reduced and the benefit of the 3D DRAM is decreased.

If the tag array is stored within the 3D DRAM 230, such as within a row that stores cache line data corresponding to the tags, the tag array access may be again be slow. While this storage arrangement avoids a large, slow on-chip SRAM tag array, the cache access now reads tag data from a row within the 3D DRAM 230. On a cache hit, a subsequent read or write operation accesses the data within a row buffer storing the tag and the data corresponding to a given memory request.

For either of the implementations described above for tag array storage, knowledge of whether a given memory request has corresponding data stored in the 3D DRAM 230 may reduce an overall memory access latency. For example, if a cache miss occurs within each level of on-die caches within the processing unit 120, then an off-chip memory request may be generated. The cache miss may result from accesses to one or more levels of on-chip caches within the processing unit 120 and the requested block is not found. A large, row-based memory within the SiP 210, such as the 3D DRAM 230, may be subsequently accessed. The tag of the requested block may be sent to a tag array corresponding to the data stored in the 3D DRAM 230. The tag array may be stored either on the processing unit 120 or within the 3D DRAM 230.

If a tag miss occurs when accessing the 3D DRAM 230 within the SiP 210, then the memory request may be subsequently transmitted to the memory controller 226. The memory controller 226 may translate an address corresponding to the requested block and send the memory request to an off-package DRAM and/or the disk memory 262. However, both the overall memory latency and power consumption increased with the access of the 3D DRAM 230. In one embodiment, the memory request may be simultaneously sent to the 3D DRAM 230 and off-package memory, but such an implementation maintains the increased power consumption and increases traffic on respective buses and storage on respective queues.

In one embodiment, the processing unit 120 includes an access filter 228 that stores information and utilizes mechanisms indicating whether the row-based large on-package memory, such as the 3D DRAM 230, has a copy of a requested cache block. The access filter 228 may use methods and mechanisms that do not include false negatives. For example, the access filter may use bit vectors, counters, an implementation of a Bloom filter, and so forth. In addition, the access filter 228 may indicate status information corresponding to the requested cache block, such as a cache coherency state into which the cache block may be placed. In some embodiments, prior to attempting to access the 3D DRAM 230, the processing unit 120 may first check the access filter 228.

If the access filter 228 indicates the requested cache block does not exist in the on-package 3D DRAM 230, then a lookup operation to the 3D DRAM 230 may be skipped. A memory request corresponding to the requested cache block may instead be sent to the off-package memory. Skipping an unnecessary access of the 3D DRAM 230 may reduce the overall memory latency and power consumption for completing the memory request. In addition, traffic on corresponding buses may be reduced and overall memory bandwidth may become more efficient. In other embodiments, control logic may determine during a given period of time, the hit rate for the 3D DRAM 230 is above a given threshold. In such cases, a lookup operation into the access filter 228 may be skipped and the 3D DRAM 230 is accessed. The overall memory latency may be reduced as the lookup of the access filter 228 is removed.

Figure 3:
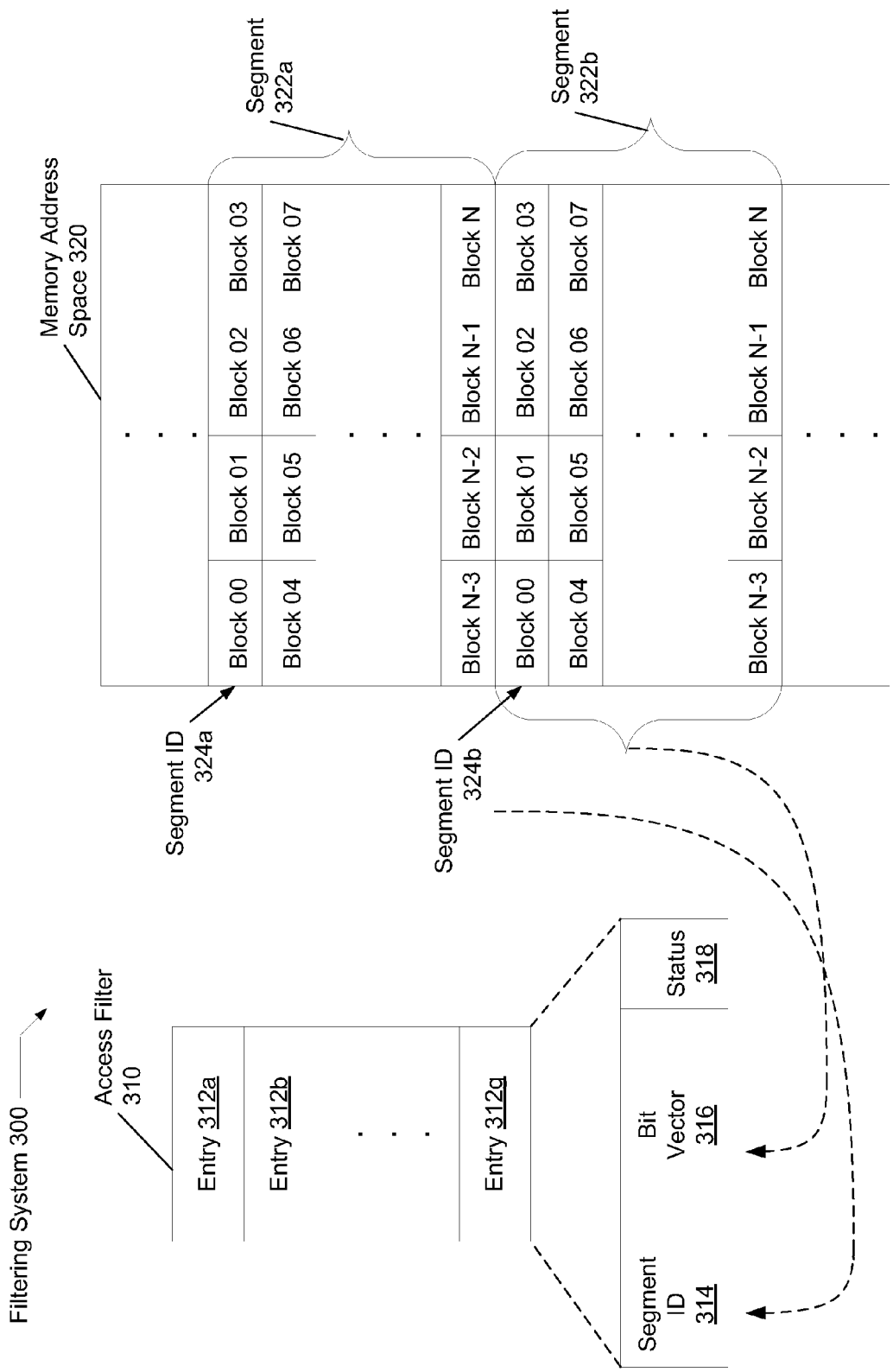
FIG. 3 is a generalized block diagram of one embodiment of a large cache filtering system.

Turning now to FIG. 3, a generalized block diagram illustrating one embodiment of a filtering system 300 is shown. In some embodiments, the memory address space 320 may be a contiguous virtual address space, wherein a mapping between virtual addresses and physical addresses determines the location of data values and application code in physical memory. In other embodiments, the memory address space 320 may be a contiguous physical address space. The memory address space 320 may generally show contiguous address space for one or more software processes. The physical memory may include the disk memory 262. One or more copies of data values and application code stored within the disk memory 262 may be stored within any off-package DRAM, the on-package 3D DRAM 230 and one or more caches or memory buffers within the processing unit 120.

In one embodiment, at least a portion of the memory address space 320 may be partitioned into one or more contiguous, aligned segments. In one embodiment, the access filter 310 includes a table of multiple entries 312a-312g. Each one of the entries 312a-312g within the access filter 310 may include information indicating whether a given cache line within a given segment in the memory address space 320 exists within the 3D DRAM 230. For example, in one embodiment, each one of the entries 312a-312g may store at least a segment identifier (ID) in field 314, a bit vector in field 316, and status information in field 318. In one embodiment, the field 318 may store a valid bit to indicate a corresponding one of the entries 312a-312g stores valid information regarding one of the segments. In another embodiment, the access filter 310 includes an entry for each one of the segments in the memory address space 320. Therefore, each one of the entries 312a-312g is valid and a separate field 318 is not included.

In one embodiment, the data portion of a cache line, or cache block, stores 64 bytes of data. Other sizes are possible and contemplated. A segment may include 32 cache lines, or 32 lines×64 bytes=2 kilobytes (KB). The upper bits of an address, whether it's virtual or physical based on an implementation within the processing unit 120, may include a segment ID. For example, the segment ID 324a may identify a beginning memory location for the segment 322a. Similarly, the segment ID 324b may identify a beginning memory location for the segment 322b. Each of the segments 322a-322b may include N cache blocks, or cache lines, wherein N is an integer. In the above example, N is 32.

The field 316 within each of the entries 312a-312g may include a bit vector of size N. Each bit within the bit vector stored in field 316 may correspond to one cache block in a corresponding segment. For example, the first bit may correspond to the first cache block within the segment. Similarly, the second bit may correspond to the second cache block within the segment, and so forth.

In one embodiment, when a cache block is allocated in the 3D DRAM 230, an entry of the entries 312a-312g that tracks information for a given one of the segments that corresponds to the allocated cache block is identified. The segment ID portion of the address may be used to find the corresponding one of the entries 312a-312g. Following, a corresponding bit within the bit vector in field 316 may be set. Similarly, when a cache block is deallocated, or evicted, from the 3D DRAM 230, an entry of the entries 312a-312g that tracks information for a given one of the segments that corresponds to the evicted cache block is identified. The segment ID portion of the address may be used to find the corresponding one of the entries 312a-312g. Following, a corresponding bit within the bit vector in field 316 may be cleared.

During a search of the access filter 310, when no entry within the entries 312a-312g is found to correspond to a requested cache block, such a miss may indicate the requested cache block is not currently stored in the 3D DRAM 230. Therefore, an access of the 3D DRAM 230 for the requested cache block may be skipped and a generated memory request may be sent to off-package memory. Similarly, during a search of the access filter 310, when an entry within the entries 312a-312g is found to correspond to a requested cache block, but a corresponding bit within the bit vector is cleared, such a miss may indicate the requested cache block is not currently stored in the 3D DRAM 230. Again, an access of the 3D DRAM 230 for the requested cache block may be skipped and a generated memory request may be sent to off-package memory.

Figure 4:
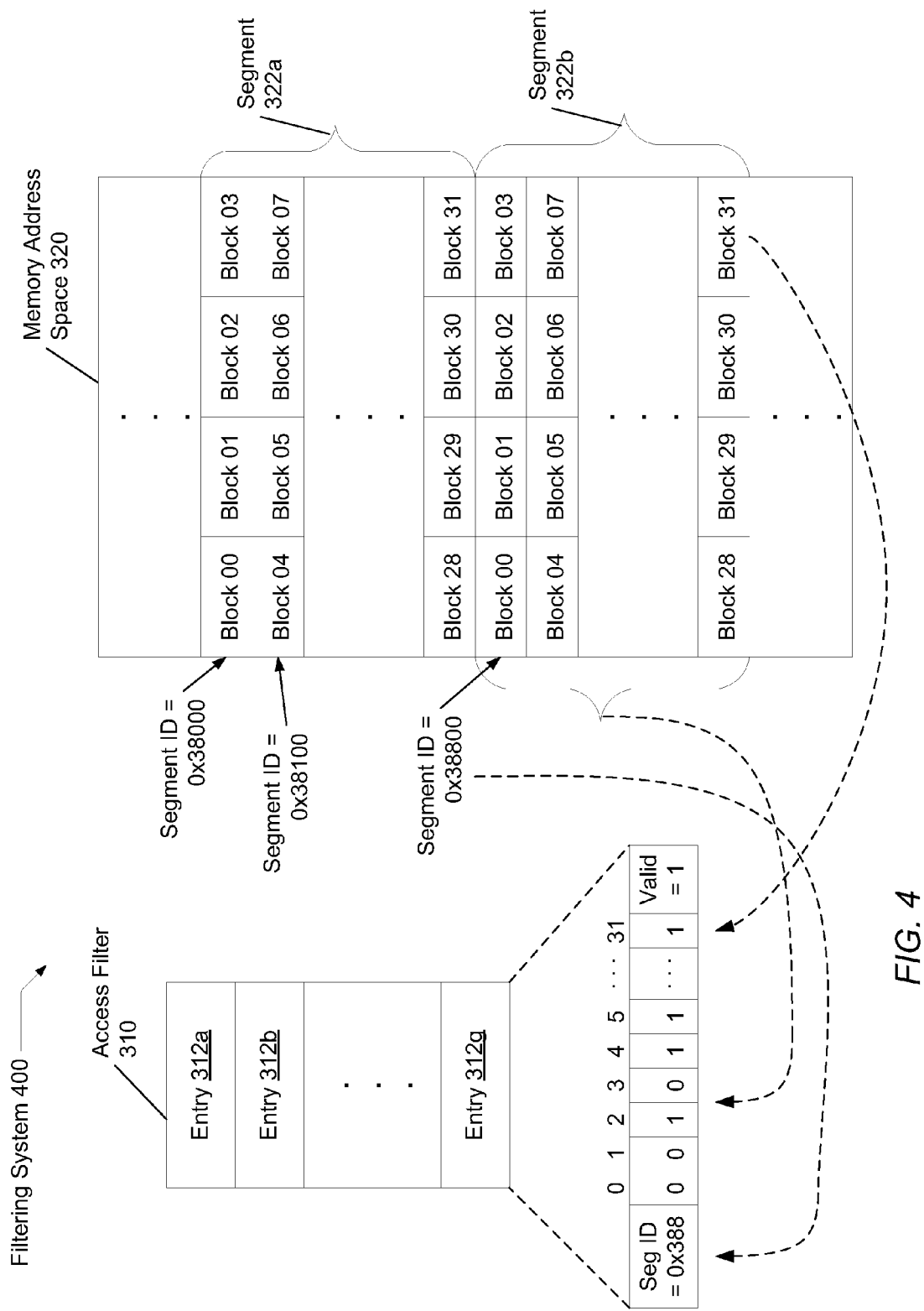
FIG. 4 is a generalized block diagram of another embodiment of a large cache filtering system.

Turning now to FIG. 4, a generalized block diagram illustrating another embodiment of a filtering system 400 is shown. Circuits and control logic described above are numbered identically. The filtering system 400 may use the same components as shown in the filtering system 300, but with illustrated example values. Each of the segments 322a-322b may include 32 cache lines, or cache blocks, wherein each cache line has a size of 64 bytes. Therefore, each of the segments 322a-322b has a size of 2 KB. Each of the entries 312a-312g within the access filter 310 may include a 32-bit vector indicating whether a corresponding one of the 32 cache lines within a corresponding segment is stored in the 3D DRAM 230.

In the example shown, the entry 312g stores a segment ID with a value of 0x388, wherein the term "0x" indicates a hexadecimal value. This particular segment ID may identify a first cache block within the segment 322b in the memory address space 320. In the example shown, the first bit shown as bit 0 corresponds with the first cache block shown as block 00. The reset value in bit 0 indicates the cache block identified by block 00 in the segment 322b is not stored in the 3D DRAM 230. Similarly, the cache blocks shown as block 01 and block 03 are not stored in the 3D DRAM 230.

Continuing with the above example, the set bits shown as stored in bit positions 2, 4, 5 and 31 of the 32-bit vector may indicate the cache blocks shown as block 02, block 04, block 05 and block 31 within the segment 322*b* are currently stored in the 3D DRAM 230. In other implementations, the meaning of a set bit and a cleared bit may be reversed. In order to avoid data corruption, when the access filter 310 indicates a requested cache block is not currently stored in the 3D DRAM 230, this indication is ensured to be correct. However, when the access filter 310 indicates a requested cache block is currently stored in the 3D DRAM 230, this indication may be wrong, which causes extra accesses and power consumption, but it does not cause data corruption.

In another example, each one of the segments 322*a*-322*b* may have a size of 8 KB and each segment ID may have a size of 4 bytes. Therefore, each segment may store 128 individual 64-byte cache lines. The bit vector stored within each one of the entries 312*a*-312*g* has a size of 128 bits. Accordingly, each one of the entries 312*a*-312*g* has a size of 128 bits (16 bytes) plus 4 bytes, or 20 bytes. If the access filter 310 has a size of 4 megabytes (MB), or $2^{22}$ bytes or 4,194,304 bytes, then the access filter 310 may track 4 MB/20 bytes=209,715 segments, each with a size of 8 KB. The memory address space 320 has a resulting size of 209,715 segments×8 KB/segment, or approximately 1.7 gigabytes (GB). For comparison, a 3D DRAM 230 with a data array with a size of 1.7 GB may utilize a tag array with a size of 209,715 segments× 128 cache lines/segment×4 bytes/tag is approximately 107 MB. A 4 MB access filter is much smaller than the 107 MB tag array used for the 1.7 GB data array. When the 3D DRAM 230 has a smaller size, the access filter may reduce its size accordingly.

In the above examples, the data stored in the 3D DRAM 230 has sufficient spatial locality, wherein the stored cache lines correspond to contiguous memory locations within a large number of contiguous segments. In such cases, each one of the entries 312*a*-312*g* within the access filter 310, or a vast majority of these entries, contain a bit mask with a number of bits equal to a number of cache lines within a given segment. Each bit in this bit mask represents an individual cache line. However, it is possible a large number of cache lines stored in the 3D DRAM 230 correspond to memory locations in separate, non-contiguous segments within the memory address space 320.

Continuing with placement of memory caches lines stored in the 3D DRAM 230, in one extreme example, each stored cache line originates from a memory location in a unique segment within the memory address space 320. In this extreme example, each one of the entries 312*a*-312*g* within the access filter 310, or a vast majority of these entries, contain a bit mask with a size of only a single bit equal to a single tracked cache line within a given segment.

Using the values in the above example above, wherein each one of the segments 322*a*-322*b* may have a size of 8 KB, each segment ID may have a size of 4 bytes, a cache line is 64 bytes, and the bit vector stored within each one of the entries 312*a*-312*g* has a size of 128 bits. Accordingly, each one of the entries 312*a*-312*g* has a size of 128 bits (16 bytes) plus 4 bytes, or 20 bytes. If the access filter 310 has a size of 4 megabytes (MB), or $2^{22}$ bytes or 4,194,304 bytes, then the access filter 310 may track 4 MB/20 bytes=209,715 segments, wherein each segment now has only a single cache line of 64 bytes stored in the 3D DRAM 230. Each one of the segments 322*a*-322*b* in this example no longer has 8 KB worth of caches lines stored in the 3D DRAM 230. In this example, the supported memory address space 320 has a resulting size of 209,715 segments×64 bytes/segment, instead of 8 KB/segment, or approximately 13 MB. The supported memory address space of 13 MB is far less than the 1.7 GB supported memory address space in the earlier example. Therefore, other techniques may be used within the access filter 310 to support a larger memory address space.

Figure 5:
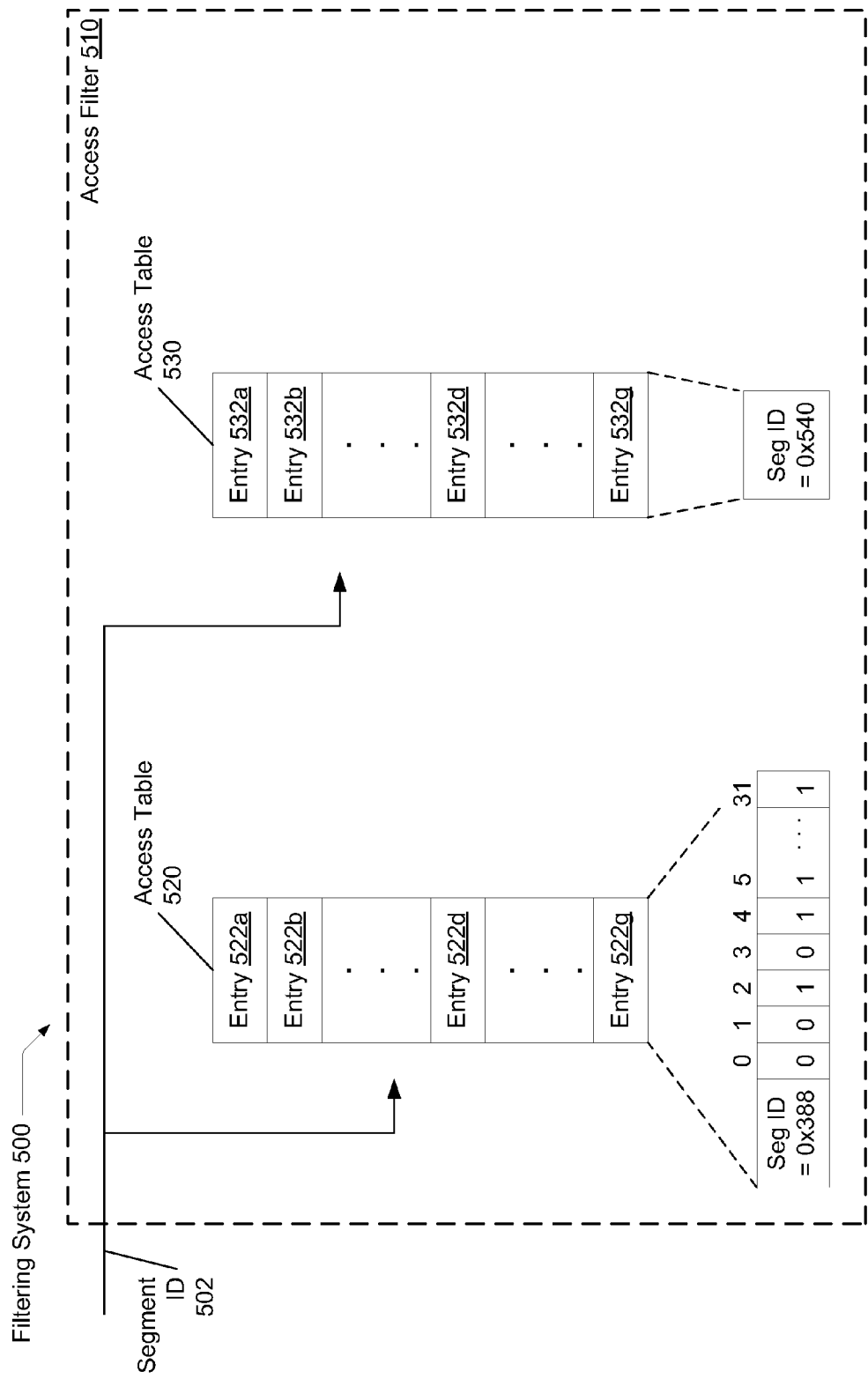
FIG. 5 is a generalized block diagram of another embodiment of a large cache filtering system.

Turning now to FIG. 5, a generalized block diagram of another embodiment of a large cache access filtering system 500 is shown. The access filter 510 may include two tables, such as access table 520 and access table 530. In one embodiment, each one of the entries 522*a*-522*g* in the access table 520 maintains tracking information for each segment in a memory address space that has at least one cache line stored in the 3D DRAM 230. The tracking information may include a bit vector as described earlier.

In contrast to the access table 520, each one of the entries 532*a*-532*g* in the access table 530 may identify each segment in a same memory address space that has no cache line stored in the 3D DRAM 230. Therefore, each one of the entries 532*a*-532*g* in access table 530 may omit a bit vector, since it is known already each bit would be cleared. The omission of a bit vector may reduce storage space overhead. The access filter 510 may receive a segment ID 502 prior to an access of the 3D DRAM 230. The received segment ID 502 may be used to index each of the access tables 520 and 530. When a matching segment ID is found within the access table 530, it may be known that the 3D DRAM 230 does not store any cache lines within this particular segment of the memory address space. Therefore, a generated memory request may be sent to off-package memory and an access of the 3D DRAM 230 may be skipped.

Figure 6:
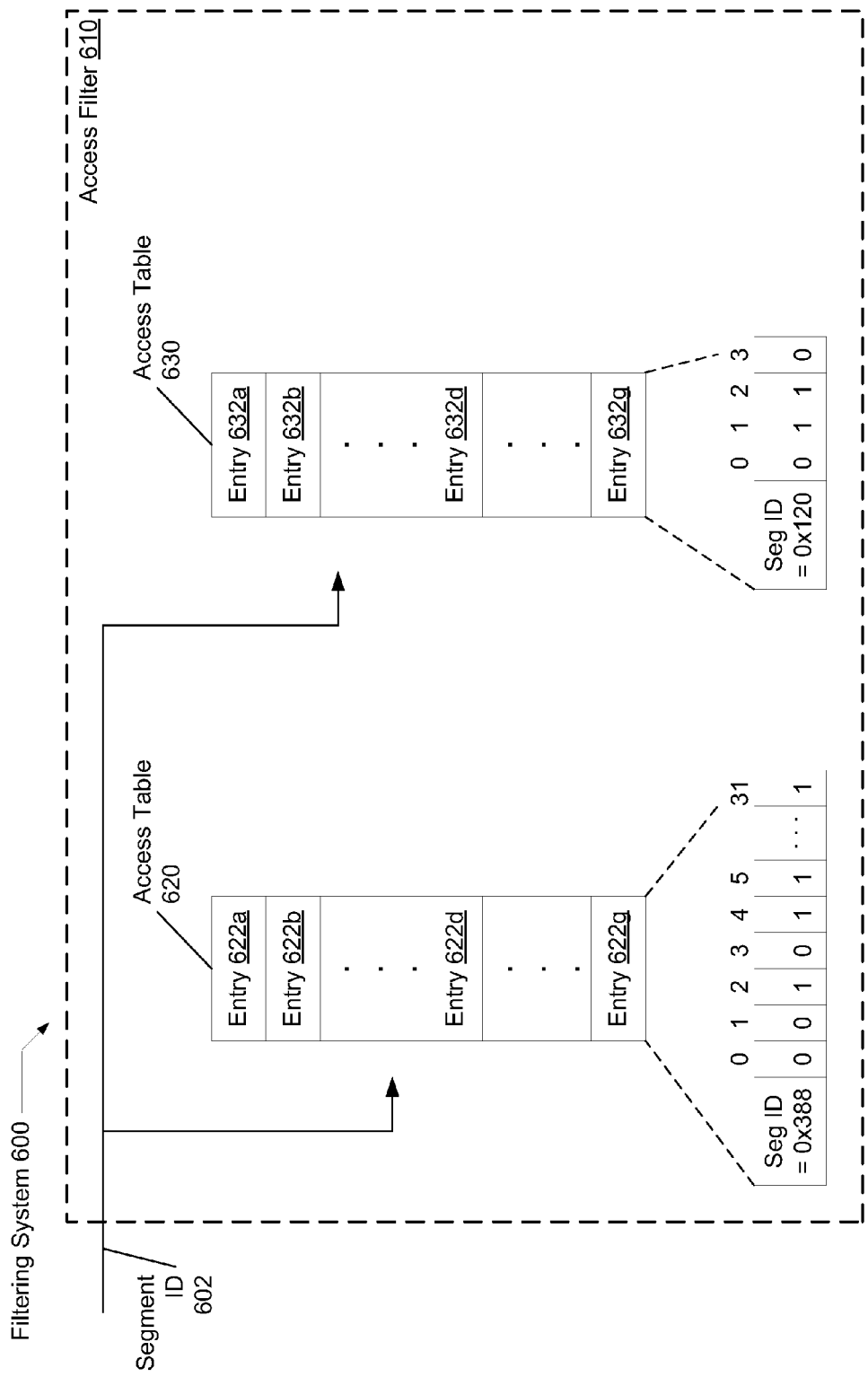
FIG. 6 is a generalized block diagram of yet another embodiment of a large cache filtering system.

Referring now to FIG. 6, a generalized block diagram of another embodiment of a large cache access filtering system 600 is shown. The access filter 610 may receive a segment ID 602 prior to an access of the 3D DRAM 230. The received segment ID 602 may be used to index each of the access tables 620 and 630. When a matching segment ID is found within the access table 630, it may be determined whether the 3D DRAM 230 stores a requested cache line within this particular segment of the memory address space. If not, a generated memory request may be sent to off-package memory and an access of the 3D DRAM 230 may be skipped.

The access filter 610 may include two tables, such as access table 620 and access table 630. In one embodiment, each one of the entries 622*a*-622*g* in the access table 620 maintains large cache storage tracking information for each segment in a memory address space that has a size of 8 KB. Similar to the examples described earlier, each one of the entries 622*a*-622*g* includes a bit vector of a size of 32 bits.

In contrast to the access table 620, each one of the entries 632*a*-632*g* in the access table 630 may maintain large cache storage tracking information for each segment in a memory address space that has a size of 1 KB. Using the sizes and values in the examples described earlier, each one of the entries 632*a*-632*g* may include a bit vector of a size of 4 bits. In such an embodiment, the size of a given bit vector may be reduced to track large cache storage information for regions of the memory address space that are not heavily utilized. Therefore the granularity of the tracking information may change according to a density of accesses in regions of the memory address space. In yet another embodiment, a table that maintains large cache storage tracking information, such as the access table 620, may utilize a separate bit vector for each sub-segment within a segment. In other embodiments, different sized bit vectors may be used according to a different granularity of the tracking information. Further, additional tables may be used. For example, three or more tables may be used, each with a differing level of granularity for tracking information.

Figure 7:
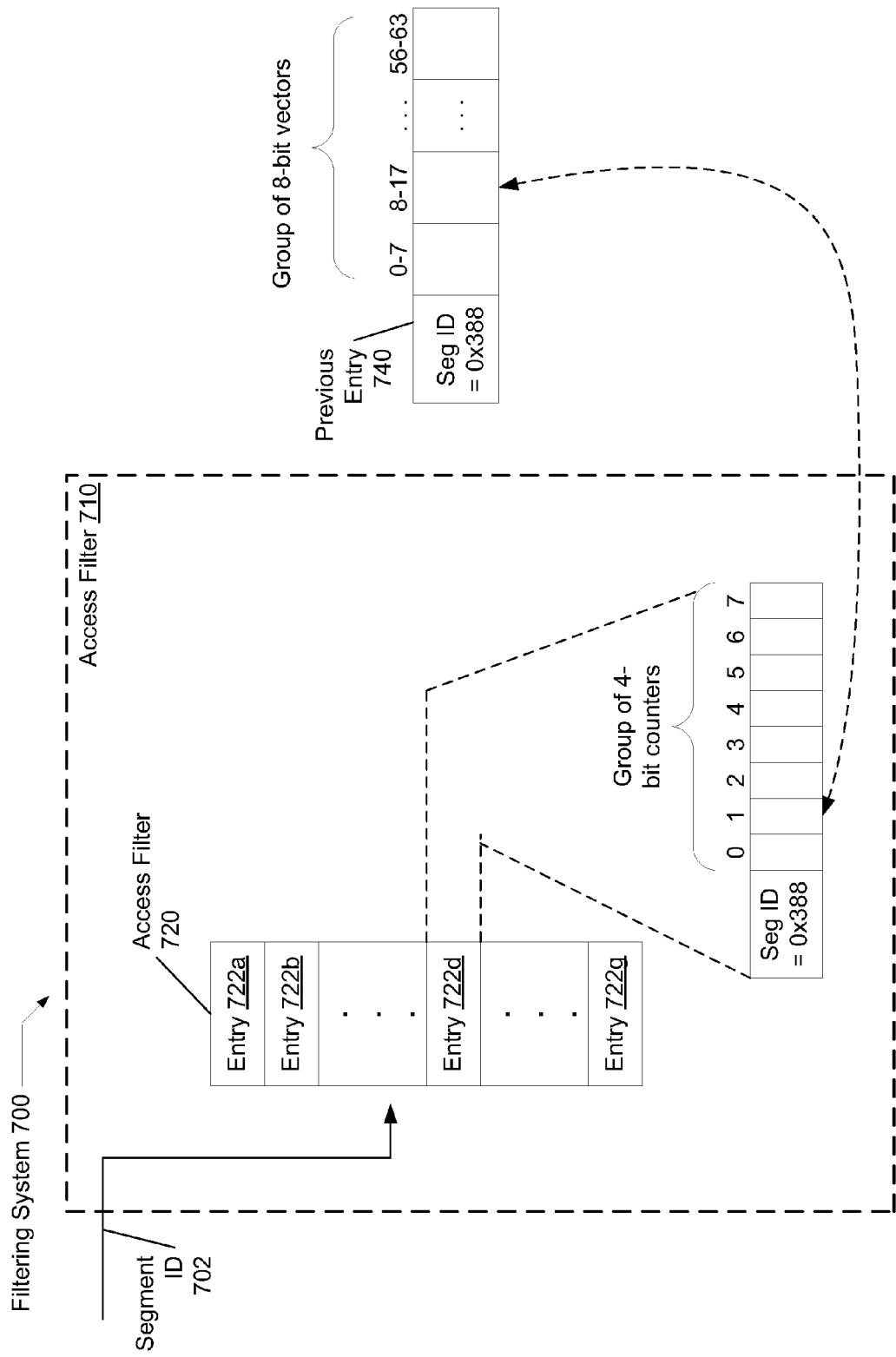
FIG. 7 is a generalized block diagram of yet another embodiment of a large cache filtering system.

Turning now to FIG. 7, a generalized block diagram of another embodiment of a large cache access filtering system 700 is shown. The access filter 710 may receive a segment ID 702 prior to an access of the 3D DRAM 230. The received segment ID 702 may be used to index the access table 720. When a matching segment ID is found within the access table 720, it may be determined whether the 3D DRAM 230 stores a requested cache lines within this particular segment of the memory address space. If not, a generated memory request may be sent to off-package memory and an access of the 3D DRAM 230 may be skipped.

The access filter 710 may include the access table 720. Referring again to FIG. 3, in one example, each one of the segments 322a-322b in a memory address space 320 may have a size of 4 KB and each segment ID may have a size of 4 bytes. Therefore, each segment may store 64 individual 64-byte cache lines. A corresponding bit vector stored within each one of the entries 312a-312g has a size of 64 bits. Accordingly, each one of the entries 312a-312g has a size of 64 bits (8 bytes) plus 4 bytes, or 12 bytes. The bit vector stored in each of the entries 312a-312g may be partitioned into groups, such as eight groups of 8 bits. In one embodiment, each group of 8 bits may be replaced with a corresponding 4-bit counter. For example, each of the entries 722a-722g in the access table 720 has a 4-bit counter for each 8-bit group.

A corresponding 4-bit counter may track a number of cache lines within a given group in a segment that are currently stored in the 3D DRAM 230. As shown, a first 4-bit counter in the entry 722d in the access table 720 may correspond to and replace a first group of 8 bits in a corresponding 64-bit vector. Similarly, a second 4-bit counter in the entry 722d in the access table 720 may correspond to and replace a second group of 8 bits in the 64-bit vector, and so forth. Each one of the entries 722a-722g may store 4 bits/counter×8 counters=32 bits of tracking information, rather than a 64-bit vector. A corresponding counter may be incremented when a cache line tracked by the counter is allocated in the 3D DRAM 230. The corresponding counter may be decremented when a cache line tracked by the counter is evicted from the 3D DRAM 230.

During a lookup operation for a requested cache line, if a corresponding counter has a zero value, then the counter may indicate that the requested cache line is not currently stored in the 3D DRAM 230. Accordingly, a generated memory request may be sent to off-package memory and an access of the 3D DRAM 230 may be skipped. In one embodiment, if the corresponding counter has a non-zero value, then the counter may indicate it is possible that the requested cache line is currently stored in the 3D DRAM 230. Therefore, the 3D DRAM 230 may be accessed to determine whether it is storing the requested cache line. In another embodiment, if the corresponding counter has a non-zero value, then a second table may be accessed to determine whether the requested cache line is currently stored in the 3D DRAM 230. For example, any one of the tables 520, 530, 620 and 630 may be used as a second table.

Figure 8:
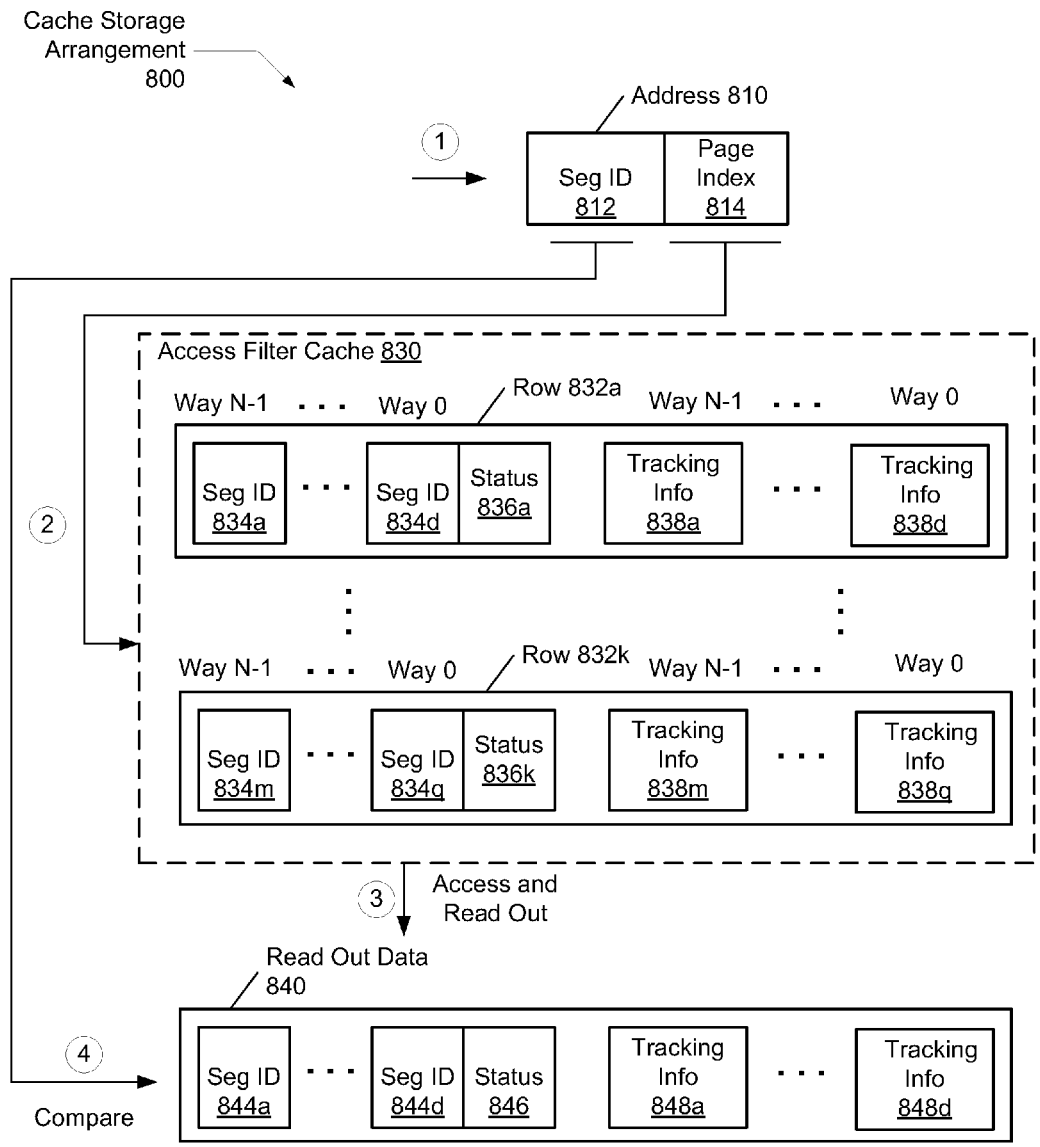
FIG. 8 is a generalized block diagram illustrating one embodiment of a cache storage arrangement for a large cache access filter.

Turning now to FIG. 8, a generalized block diagram illustrating one embodiment of a cache storage arrangement 800 for a large cache access filter is shown. As described earlier, tracking information for the 3D DRAM 230 may be stored in various manners in an access filter. This access filter for the 3D DRAM 230 may itself be organized as a fully associative or set-associative cache.

The stored tracking information within an access filter may be partitioned into cache lines within the access filter cache 830. As shown, the access filter cache 830 may include multiple rows 832a-832k. Each one of the rows 832a-832k may store segment IDs corresponding to the stored tracking information. The segment IDs and the tracking information may be stored in an N-way set-associative cache organization, wherein N is an integer greater than one. A different number of ways, such as 4-way, 8-way, 16-way, 32-way, or other, may be chosen. Further, each row may store metadata corresponding to both the row and cache lines within the row storing tracking information. The metadata may include replacement state, cache coherency state, a dirty bit, and so forth.

As shown, row 832a stores segment IDs in fields 834a-834d. In the fields 838a-838d, the row 832a may store the tracking information for cache lines that both are possibly stored in the 3D DRAM 230 and corresponding to the segment IDs in the fields 834a-834d. In one embodiment, the fields 834a-834d are stored in a same array as the fields 838a-838d. In another embodiment, the fields 834a-834d are stored in a separate array than an array storing the fields 838a-838d. The status field 836a in the row 832a may be used to store additional metadata. The stored metadata may include at least at least one or more of the following for each corresponding cache line storing tracking information: a valid bit, a cache block owner encoding that indicates the source which owns the corresponding cache block, Least Recently Used (LRU) eviction information used in association with a cache replacement algorithm employed by a cache controller, an indication that designates a cache coherency state such as modified, exclusive, owned, shared, invalid, or other; a dirty bit, prefetch hint information, profiling data, and so forth. Other types of state information are possible and contemplated.

Continuing with the stored information in the rows of the access filter cache 830, the row 832k may store information in a similar format as the row 832a. For example, the row 832k may store segment IDs in fields 834m-834q, status metadata in field 836k, and tracking information in fields 838m-838q. It is noted that although the information stored in the rows 832a-832k are shown in a particular order and in contiguous space, other placements for data storage whether contiguous or not are possible and contemplated. A particular storage arrangement may be selected based on design tradeoffs.

A sequence of steps 1-4 is shown in FIG. 8 for accessing tracking information stored in the access filter cache 830. During sequence 1, a memory request may have missed in one or more caches and/or memory buffers within the processing unit 120. Prior to accessing the 3D DRAM 230, a portion of a complete address, which is shown as address 810, may be used to index into the access filter cache 830. The fields 812 and 814 may store a segment ID and a page index, respectively. During sequence 2, a given row of the rows 432a-432k may be selected from other rows by the page index 814.

During sequence 3, data may be read from the selected one of the rows 832a-832k. In one embodiment, all of the data within the selected row is read out as shown in the read out data 840. This data may be stored in registers. In another embodiment, the segment IDs are compared with the segment ID stored in the field 812 prior to reading and only the tracking information corresponding with a matching segment ID is read out. In such an embodiment, the read out data 840 is smaller than shown. In addition, the sequence 4 occurs prior to the sequence 3.

During sequence 4, a hit may occur when the segment ID stored in field 812 matches a segment ID value stored in one of the fields 844a-844d in the row read out data 840 and a corresponding state stored in the field 846 indicates a corresponding row is valid. A given one of the fields 848a-848d may be selected based on the segment ID comparison result. Each one of the fields 848a-848d may store tracking information that doesn't include false negatives. For example, a bit vector or a count value may be used as described earlier. In other embodiments, one of various Bloom filters may be used. In yet other embodiments, a hash function and a hash table may be used in combination with one or more of the above methods and mechanisms. Numerous such embodiments are possible and are contemplated. The selected one of the fields 848a-848d is read and a determination is made whether or not to access the 3D DRAM 230 based on the information within the selected field. Afterward, the state information stored in field 846 corresponding to the selected field and row is updated. For example, a cache coherency state may have changed, a LRU replacement state may have changed, a cache block owner identifier (ID) may have changed, both prefetch hint information and profiling data may have changed, and so forth. An update of the tracking information may additionally occur. The selected row may be written with the updated information.

When tracking information is inserted into the access filter cache 830 in a given one of the rows 832a-832k and sufficient space is unavailable, one of the cache lines storing tracking information may be evicted. Any LRU replacement state information stored in the given row may be used to determine which cache line to evict. In addition, the tracking information itself may be used in the determination. For example, if row 832a is selected for allocation, a resulting eviction occurs, and a given one of the fields 838a-838d indicates no cache lines for a corresponding segment are stored in the 3D DRAM 230, then this given field may be evicted with no extra requests sent or work performed.

Continuing with selecting a victim field of the fields 838a-838d to evict from the row 832a, if a given one of the fields has a low value indicating a small number of cache lines for a corresponding segment are stored in the 3D DRAM 230, then this given field may be evicted ahead of fields indicating a high number of cache lines stored in the 3D DRAM 230. However, care may be taken when evicting a given one of the fields 838a-838d with tracking information indicating at least one cache line for a corresponding segment is stored in the 3D DRAM 230. Extra steps may be taken to ensure the large cache filtering system does not lose track of the one or more cache lines both stored in the 3D DRAM 230 and associated with the given one of the fields 838a-838d to be evicted. A dirty bit corresponding to each segment ID stored in a given row may be set when corresponding tracking information indicates at least one cache line in the segment is stored in the 3D DRAM 230. A cleared dirty bit for a segment ID may make the segment ID a candidate for eviction.

In one embodiment, when a given one of the fields 838a-838d is selected for eviction from the access filter cache 830, each cache line indicated by the given field to be stored in the 3D DRAM 230 may be evicted from the 3D DRAM 230. However, evicting currently stored cache lines in the 3D DRAM 230 corresponding to the selected segment may be qualified prior by the cache coherency protocol. The protocol may first allow shared coherence state information to be silently dropped, while modified and owned coherence states are handled with probes or other mechanisms. In other embodiments, the 3D DRAM 230 may be a memory controller cache that is past the global ordering and serialization point. In such embodiments, the cache coherency tracking might not exist in the 3D DRAM 230.

Figure 9:
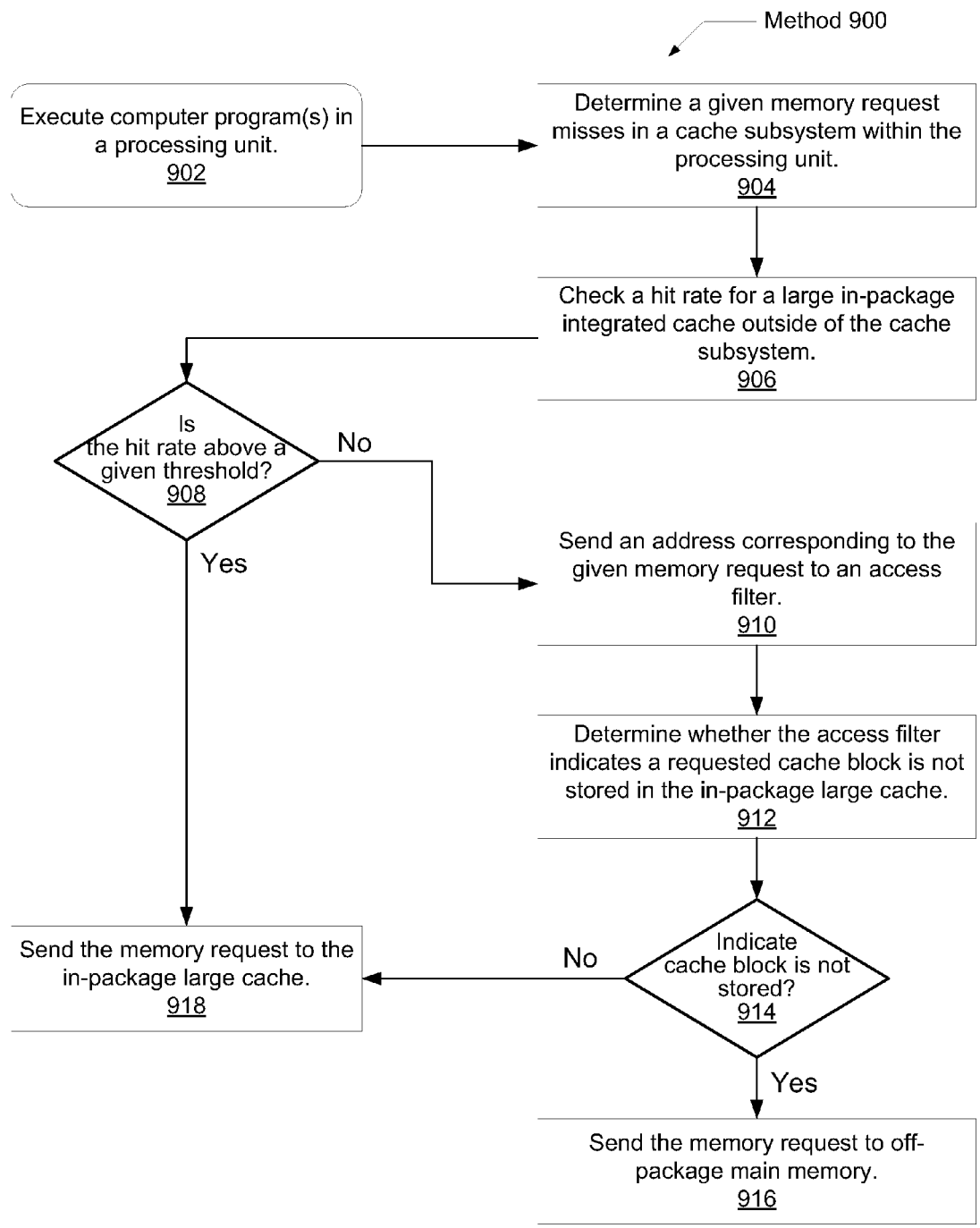
FIG. 9 is a generalized flow diagram illustrating one embodiment of a method for filtering accesses to a large cache.

Referring now to FIG. 9, a generalized flow diagram of one embodiment of a method 900 for filtering accesses to a large cache is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

One or more computer programs, or software applications, execute in block 902. A processing unit may execute these applications. Examples of a processing unit are given earlier. The processing unit may be within a System-in-Package (SiP) that also includes a large in-package cache used as a last-level cache prior to accessing off-chip memory. In one embodiment, the in-package large cache is a 3D integrated memory, such as a 3D DRAM.

In block 904, the processing unit may determine a given memory request misses within a cache memory subsystem within the processing unit. In block 906, control logic within the processing unit may check a hit rate for the large in-package integrated cache outside of the cache subsystem. Again, this in-package large cache may be a last-level cache within the SiP. If the hit rate is above a given threshold (conditional block 908), then in block 918, the processing unit generates a memory request to send to the in-package large cache. If the hit rate is below the given threshold (conditional block 908), then in block 910, the processing unit indexes an access filter with at least a portion of an address corresponding to the given memory request.

In block 912, the access filter indicates whether the requested cache block associated with the memory request is not stored in the in-package large cache. One or more tables or a cache organization within the access filter may be used to store tracking information as described earlier. If the access filter indicates the requested cache block is not stored within the in-package large cache (conditional block 914), then in block 916, the processing unit generates a memory request to send to off-package main memory. If the access filter indicates the requested cache block is stored within the in-package large cache (conditional block 914), then the control flow of method 900 moves to block 918, wherein the processing unit generates a memory request to send to the in-package large cache.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
  a processing unit on a first chip configured to generate memory requests, wherein the processing unit includes an access filter; and
  a cache on a second chip, wherein the cache is coupled to the first chip in a package;
  wherein the processing unit is configured to:
    determine whether to access the access filter for a given memory request based on a hit rate of the cache, the access filter being configured to store information that indicates whether the cache includes data corresponding to a memory request;
    in response to determining the hit rate is below a given threshold:
      access the access filter to determine whether data corresponding to the memory request is stored in the cache;
    in response to determining the hit rate is above the given threshold:
      forgo access of the access filter; and
      generate a memory access to the cache.

2. The computing system as recited in claim 1, wherein in response to determining the hit rate is below the given threshold, the processing unit is configured to generate a memory access to the cache responsive to determining the access filter indicates data corresponding to the memory request is stored in the cache.

3. The computing system as recited in claim 2, wherein the cache on the second chip is a three-dimensional (3D) integrated circuit (IC) within a system in package (SiP).

4. The computing system as recited in claim 3, wherein the cache on the second chip utilizes at least one of the following memory configurations: a dynamic random access memory (DRAM), a phase-change memory (PCM), an array of memristors (RRAM), and a spin-torque transfer magnetoresistive RAM (STT-MRAM).

5. The computing system as recited in claim 4, wherein the processing unit is at least one of the following: a general-purpose microprocessor, a graphics processing unit (GPU), an accelerated processing unit (APU), and a field programmable gate array (FPGA).

6. The computing system as recited in claim 2, wherein determining whether the given data is stored within the cache comprises:
  identifying a given row of a plurality of rows within the access filter based on at least an address associated with the given memory request;
  selecting a given field within the given row storing tracking information associated with a memory location of the given data in a memory address space, wherein the tracking information has a zero rate of false negatives; and
  determining the selected tracking information indicates the given data is stored within the cache.

7. The computing system as recited in claim 6, wherein the tracking information comprises at least one of the following: a bit vector, an incrementing and decrementing counter value, and a Bloom filter output value.

8. The computing system as recited in claim 2, wherein determining whether the given data is stored within the cache comprises:
  identifying a given row of a set-associative cache within the access filter based on an address associated with the given memory request;
  selecting a given cache block storing tracking information associated with a memory location of the given data in a memory address space within the identified given row, wherein the tracking information has a zero rate of false negatives; and
  determining the selected tracking information indicates the given data is stored within the cache.

9. A method comprising:
  generating memory requests within a processing unit on a first chip coupled to second chip including a cache, wherein the processing unit includes an access filter;
  determining whether to access the access filter for a given memory request based on a hit rate of the cache;
  in response to determining hit rate is below a given threshold:
    accessing the access filter to determine whether data corresponding to the memory request is stored in the cache;
  in response to determining the hit rate is above the given threshold:
    forgoing access of the access filter: and
    generating a memory access to the cache.

10. The method as recited in claim 9, wherein in response to determining the hit rate is below the given threshold, the method comprises generating a memory access to the cache responsive to determining the access filter indicates data corresponding to the memory request is stored in the cache.

11. The method as recited in claim 10, wherein the cache on the second chip is a three-dimensional (3D) integrated circuit (IC) fabricated horizontally or vertically relative to the processing unit within a system in package (SiP).

12. The method as recited in claim 11, wherein the cache on the second chip utilizes at least one of the following memory configurations: a dynamic random access memory (DRAM), a phase-change memory (PCM), an array of memristors (RRAM), and a spin-torque transfer magnetoresistive RAM (STT-MRAM).

13. The method as recited in claim 12, wherein the processing unit is at least one of the following: a general-purpose microprocessor, a graphics processing unit (GPU), an accelerated processing unit (APU) and a field programmable gate array (FPGA).

14. The method as recited in claim 10, wherein to determine whether the given data is stored within the cache, the method further comprises:
   identifying a given row of a plurality of rows within the access filter based on at least an address associated with the given memory request;
   selecting a given field within the identified given row storing tracking information associated with a memory location of the given data in a memory address space, wherein the tracking information has a zero rate of false negatives; and
   determining the selected tracking information indicates the given data is stored within the cache.

15. The method as recited in claim 14, wherein the tracking information comprises at least one of the following: a bit vector, an incrementing and decrementing counter value, and a Bloom filter output value.

16. The method as recited in claim 10, wherein to determine whether the given data is stored within the cache, further comprising:
   identifying a given row of a set-associative cache within the access filter based on an address associated with the given memory request;
   selecting a given cache block storing tracking information associated with a memory location of the given data in a memory address space within the identified given row, wherein the tracking information has a zero rate of false negatives; and
   determining the selected tracking information indicates the given data is stored within the cache.

17. A processing unit on a first chip comprising:
   one or more tables storing tracking information indicating whether given data associated with a given memory request is stored within a cache on a second chip, wherein the cache is coupled to the first chip in a package; and
   control circuitry configured to:
      determine whether to access the access filter for a given memory request based on a hit rate of the cache, the access filter being configured to store information that indicates whether the cache includes data corresponding to a memory request;
      in response to determining the hit rate is below a given threshold:
         access the access filter to determine whether data corresponding to the memory request is stored in the cache;
      in response to determining the hit rate is above the given threshold:
         forgo access of the access filter; and
         generate a memory access to the cache.

18. The computer system as recited in claim 17, wherein in response to determining the hit rate is below the given threshold, the processing unit is configured to generate a memory access to the cache responsive to determining the access filter indicates data corresponding to the memory request is stored in the cache.

19. The computer system as recited in claim 18, wherein the cache on the second chip is a three-dimensional (3D) integrated circuit (IC) within a system in package (SiP).

20. The computer system as recited in claim 19, wherein the cache on the second chip utilizes at least one of the following memory configurations: a dynamic random access memory (DRAM), a phase-change memory (PCM), an array of memristors (RRAM), and a spin-torque transfer magnetoresistive RAM (STT-MRAM).

* * * * *